United States Patent [19]
Girault et al.

[11] Patent Number: 4,592,654
[45] Date of Patent: Jun. 3, 1986

[54] HEAD-UP GUNSIGHT USING A SINGLE OPTICAL COMPONENT FOR VIEWING BOTH A RETICLE AND LANDSCAPE

[75] Inventors: Hervé Girault, Bordeaux; Francois H. Gauthier, Boulogne-Billancourt; Daniel Thomasson, Ambares, all of France

[73] Assignee: Thomson-CSF, Paris, France

[21] Appl. No.: 534,832

[22] Filed: Sep. 22, 1983

[30] Foreign Application Priority Data

Sep. 24, 1982 [FR] France ............................... 82 16160

[51] Int. Cl.⁴ ...................... G02B 27/00; G02B 23/00; G02B 23/10; F41B 1/00
[52] U.S. Cl. .................................... 356/247; 89/41.06; 350/174; 356/141; 356/252; 356/253; 356/254; 356/255
[58] Field of Search ............... 356/251, 141, 255, 252, 356/253, 254; 89/41 L; 350/174

[56] References Cited

U.S. PATENT DOCUMENTS

| | | | |
|---|---|---|---|
| 3,582,178 | 6/1971 | Boughton | 356/252 X |
| 3,671,100 | 6/1972 | Bushman et al. | 356/251 X |
| 3,672,782 | 6/1972 | Akin Jr. | 356/251 |
| 3,936,137 | 2/1976 | Litman | 356/252 X |
| 3,940,204 | 2/1976 | Withrington | 350/372 |
| 4,199,257 | 4/1980 | Dosch et al. | 356/252 |
| 4,261,647 | 4/1981 | Ellis | 356/253 X |

FOREIGN PATENT DOCUMENTS

| | | |
|---|---|---|
| 0007039 | 1/1980 | European Pat. Off. |
| 2075391 | 9/1971 | France . |
| 1193791 | 6/1970 | United Kingdom . |
| 2056634 | 3/1981 | United Kingdom ............. 356/251 |

*Primary Examiner*—John E. Kittle
*Assistant Examiner*—Mukund J. Shah
*Attorney, Agent, or Firm*—Oblon, Fisher, Spivak, McClelland & Maier

[57] ABSTRACT

A sight such as a gunsight for a helicopter comprises a movable assembly including a reticle generator and a single optical component which is both semireflecting and capable of collimating the image of the reticle. The movable assembly is driven by drive means under servo control to superpose the image of the reticle at an aiming point on a landscape. The aiming point may be computed to make corrections for the behaviour of a ballistic weapon. The single optical component may comprise a hologram physically in the shape of a portion of a surface of a sphere, but acting optically like a portion of the surface of a paraboloid. The optical component may be fixed to the reticle generator by mechanical fixing means which mask the field of view around the optical component very little.

10 Claims, 7 Drawing Figures

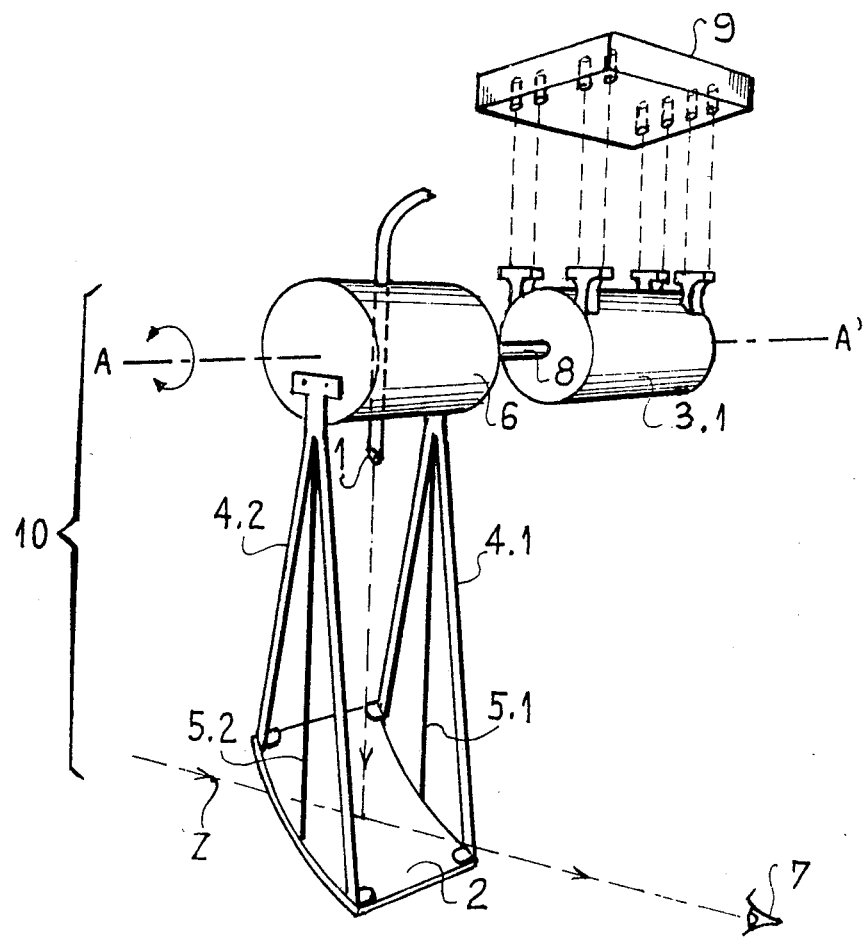
FIG_1-a

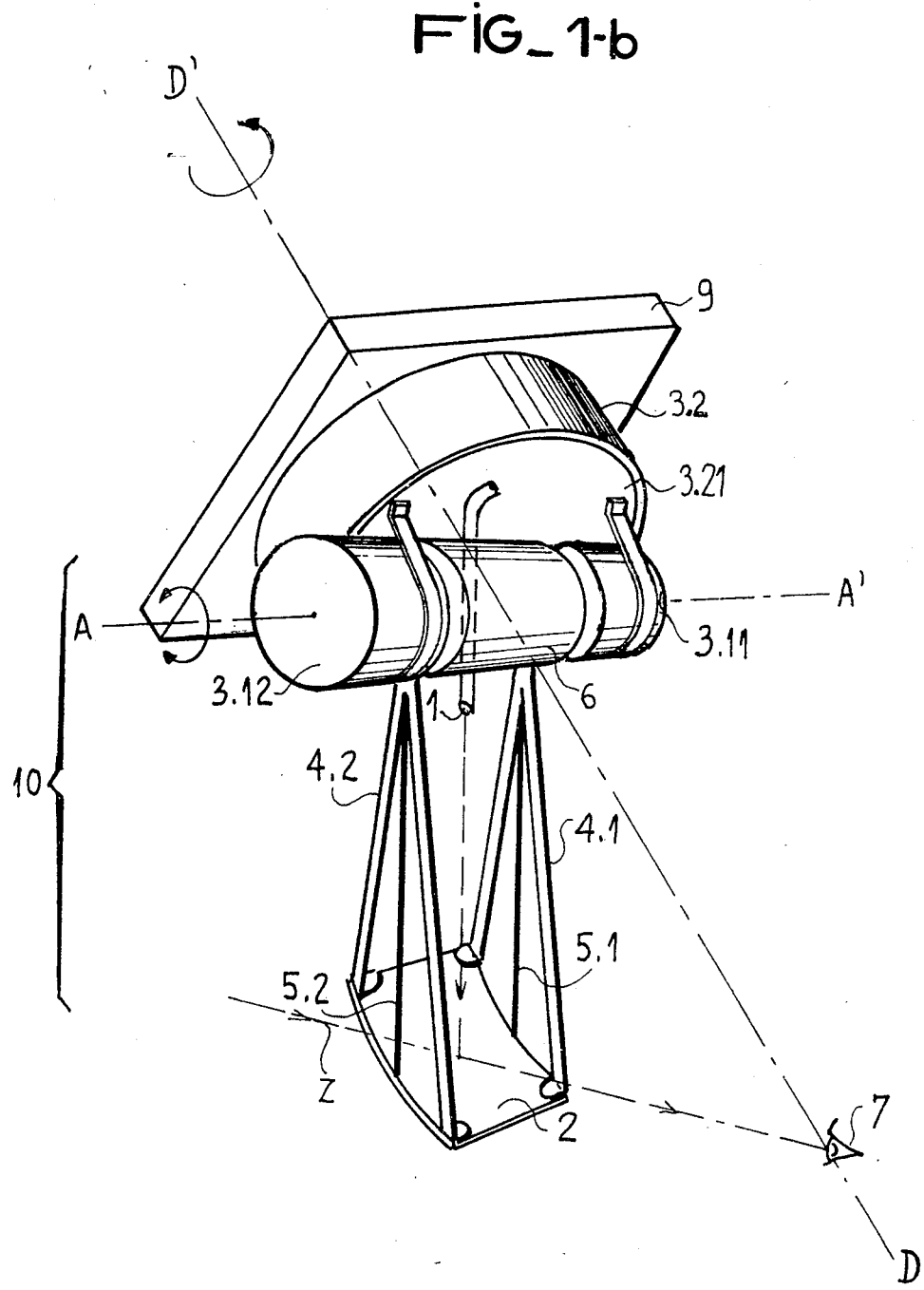

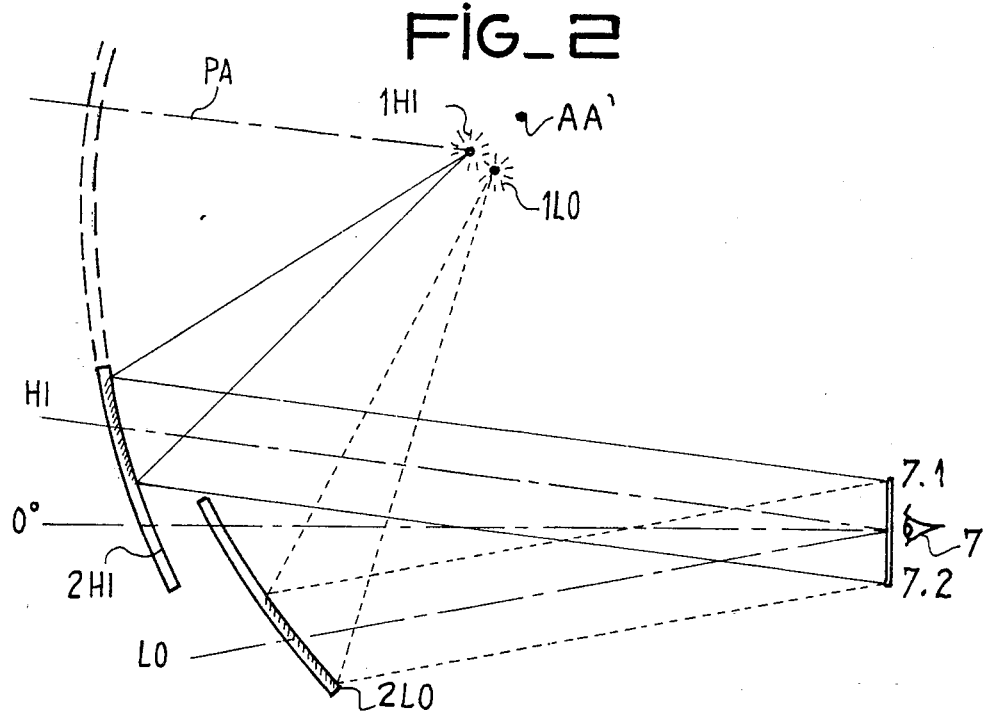
FIG_2
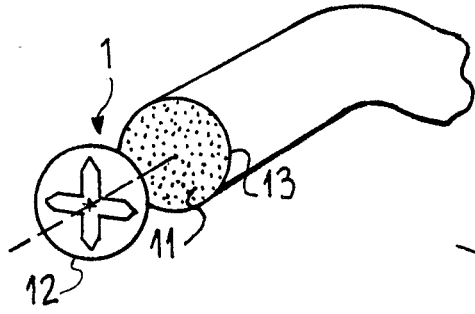
FIG_3
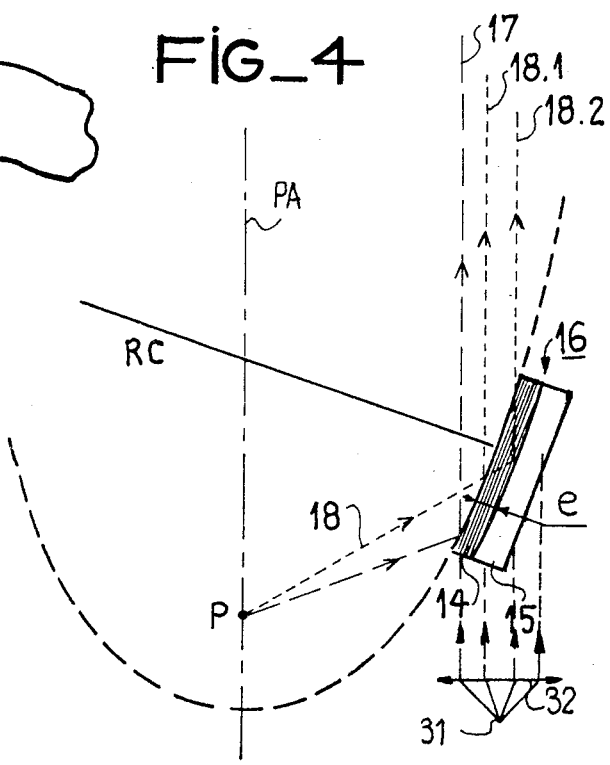
FIG_4

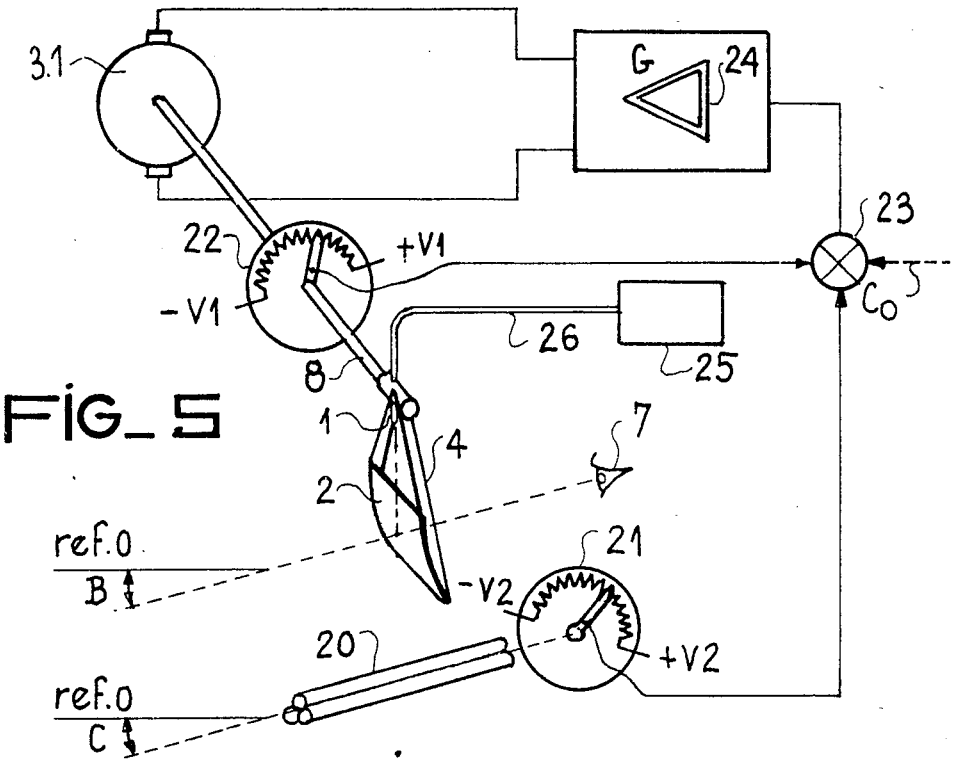
FIG_5
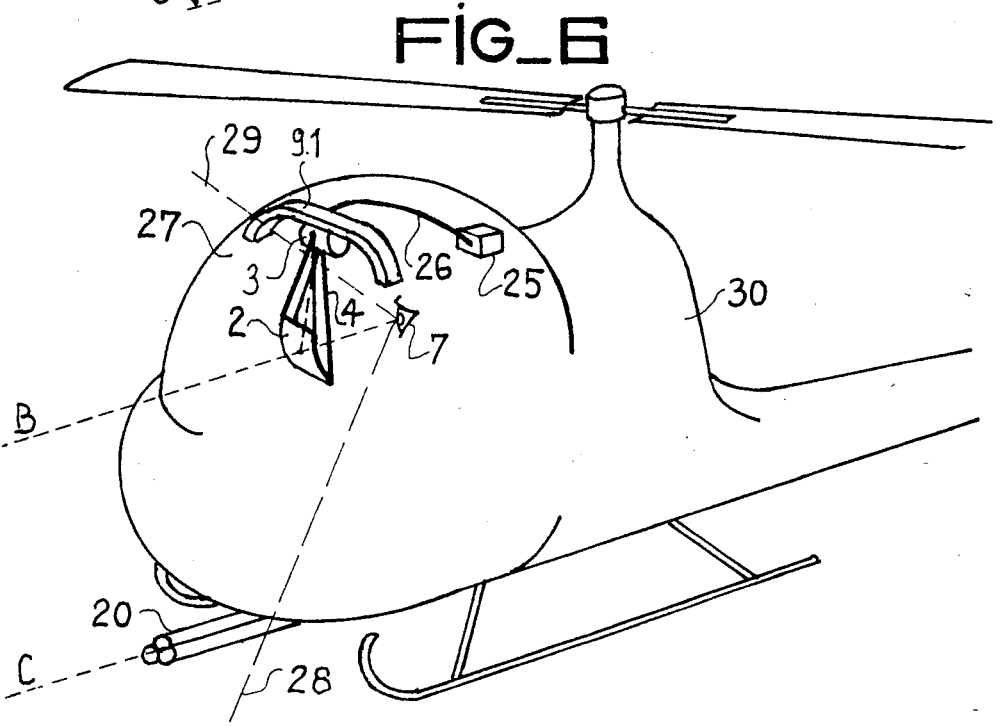
FIG_6

4,592,654

HEAD-UP GUNSIGHT USING A SINGLE OPTICAL COMPONENT FOR VIEWING BOTH A RETICLE AND LANDSCAPE

BACKGROUND OF THE INVENTION

1. Field of the Invention

The present invention relates to a head-up sight usable as a gunsight, and enabling landscape to be observed simultaneously with a collimated image of a reticle.

2. Description of the Prior Art

Such sights include a reticle generator which may itself include a cathode ray tube (CRT) for example, an optical collimator device comprising one or more lenses, and a partially reflective plate having parallel faces. The plate serves to reflect the collimated image of the reticle towards the eye while enabling an external landscape to be obeserved at the same time. In such equipment, the reticle generator and the collimating optics are mounted in the same housing. If the housing is located in the field of view of the observer using the sight, it may constitute a considerable mask by virtue of its size. In such circumstances, the observer's eye sees clearly those images which are transmitted through the partially reflective plate, but does not see other portions of the landscape which are hidden by the obstacle of the housing for the optical collimator device.

Furthermore, in order to change the direction of aim, the reticle is caused to move over the CRT screen. The limits of reticle movement on the screen determine the size of field for the collimating optics, and this field is large relative to the size of the reticle. An optical collimator device capable of such performance is not simple.

Preferred embodiments of the present invention provide a head-up sight which does not mask the field of view in the manner described above, which makes use of easily fabricated optical components, and which has a wide field of aim.

SUMMARY OF THE INVENTION

The present invention provides a head-up sight comprising:

a luminous reticle generator;
a single optical component both for producing a collimated image of the reticle and for enabling said image to be viewed simultaneously with an external landscape;
mechanical means for fixing the single optical component relative to the reticle to constitute a movable assembly; and
drive means for rotating the assembly to move the reticle image and perform the aiming function.

BRIEF DESCRIPTION OF THE DRAWINGS

Embodiments of the invention are described by way of example with reference to the accompanying drawings. Items which appear in several of the figures have the same reference numerals in all of them. For the sake of clarity, the proportions of different items in any given figure are not necessarily to scale. In the drawings:

FIGS. 1a and 1b are diagrammatic perspective views of two examples of a sight in accordance with the invention;

FIG. 2 is an optical ray diagram showing the different paths followed by light rays for observing the reticle image at different aiming positions of the sight;

FIG. 3 is a diagrammatic perspective view of one form of reticle generator;

FIG. 4 is a geometrical diagram showing one way of realizing a single collimating and mixing optical component in the form of a holographic mirror;

FIG. 5 is a diagram for explaining how the aiming point is servo-controlled to the direction in which an associated device is pointing; and FIG. 6 is a diagrammatic perspective view of the sight mounted as a gunsight in a helicopter.

DESCRIPTION OF THE PREFERRED EMBODIMENT

FIG. 1a shows a first embodiment of a head-up sight 10 in accordance with the invention. A reticle generator 1 emits light rays towards an optical device 2. The optical device 2 reflects the light towards the eye 7 of an observer of the light rays coming from the reticle generator 1. In addition, the optical device 2 passes light rays from a landscape under observation. The optical device 2 is partially reflective, and also serves to collimate the luminous reticle in the direction of the observer's normal sight axis Z.

The collimating function of the partially reflective device 2 may be obtained by its shape. To begin with, assume that the shape is an off-axis portion of a paraboloid surface whose focus coincides with the position of the reticle. It is a property of a paraboloidal mirror that it reflects light from a point source located at its focus in a direction parallel to its axis of revolution. The axis of revolution of the portion of paraboloid must thus be parallel to the axis Z. The portion used here is said to be "off-axis" because the axis of the paraboloid of which it is a part does not pass through it. The light rays from the reticle generator and reflected by the device 2 are thus parallel to one another, and the device 2 thus collimates the reticle.

FIG. 1a shows drive means 3.1 for rotating the assembly constituted by the reticle generator 1, the device 2, and a link member 6 about an axis AA'. A set of thin rods 4.1–4.2 together with optional stays 5.1–5.2 hold the device 2 in position relative to the member 6. These support means are designed to mask the observer's field of view very little. The axis AA' is orthogonal to the axis Z. The drive means 3.1 drives the assembly by means of a shaft 8 which is fixed to the member 6 and which is collinear with the axis AA'. The drive means 3.1 may be constituted by an electric motor, for example. It is fixed to a support 9.

In another embodiment, shown in FIG. 1b, the drive means includes two sets of motors. A first set of motors 3.11 and 3.12 drives the link member 6 about the axis AA' and is itself fixed to the rotor 3.21 of the second set of motors 3.2. The motor 3.2 is fixed to the support 9, and it provides rotary drive about an axis DD'. In a preferred embodiment of the invention the axis DD' is perpendicular to the axis AA' and passes through or close to the position of the eye 7 looking through the sight. These drive means enable the assembly comprising the link member 6, the reticle generator 1 and the device 2 to move with two degrees of rotational freedom relative to the support 9.

Operation of the sight in accordance with the invention can be seen by looking at FIG. 1a in conjunction with FIG. 2 which is a ray diagram. In FIG. 2, the eye 7 of the observer is looking at a landscape along an average direction of observation referenced 0°. In particular, the eye 7 sees an image of the reticle in an upper direction HI when the reticle generator 1 and the device 2 are in respective upper positions 1HI and 2HI relative to the axis AA'. Similarly, the eye 7 sees an image of the reticle in a lower direction LO when the reticle generator 1 and the device 2 are in respective lower positions 1LO and 2LO. As explained above, light rays from the reticle generator 1, eg. when in its position 1HI, are reflected on the device 2 in its position 2HI and the reflected rays meet the eye 7 along the upper direction HI which is parallel to the axis of revolution PA of the paraboloid.

It should be observed that from one extreme position to the other, the useful rays from the reticle generator 1, ie. those which arrive in a zone 7.1–7.2 in which the observer's eye is usually situated, are reflected from different portions of the surface of the collimating and partially reflecting device of the invention. This does not matter since the device 2 is stigmatic for its focus and infinity. In other words, the image conveyed by the parallel rays from the device 2 is the conjugate image of the reticle 1 which is placed at the focus of the device 2. However, the fact that the useful image is reflected by different portions of the device 2 does mean that the zone 7.1–7.2 over which the observer's eye may move is restricted to the area of overlap of light rays from the device 2 as it passes from one extreme position to the other over the intended aiming range. To sum up, as the reticle generator 1 and the device 2 pass from the lower position to the upper position the eye 7 of the observer should see the image of the reticle move from the direction LO to the direction HI; however, this will only be the case if the observation position of the eye is in a geometrical zone of overlap between the rays reflected from the device 2 in its various positions.

FIG. 2 can thus be used to determine the minimum height necessary for the device 2 in a direction perpendicular to the axis AA' as a function of the desired upper and lower aiming directions. In order to avoid the device 2 being too wide, where its width is measured perpendicularly to its height, it is desirable to provide a second axis of rotation DD' as shown in FIG. 1b and passing through or at least close to the average position of the observer's eye. It follows that it is always the same portion of the device 2 which is looked through regardless of the angle of rotation about the axis DD' and that the device 2 may therefore be in the form of a narrow strip.

FIG. 3 is an exploded perspective view of one example of a reticle generator 1 suitable for use in the invention. The reticle generator 1 comprises a source of light (see FIGS. 5 and 6) shining into one end of a bundle of optical fibers 11 whose other end 13 is fitted with a mask 12. The mask 12 is in the shape of a disk having a central opening, eg. in the shape of a cross. The reticle generator operates as follows: the light source illuminates one end of the bundle of optical fibers, which transmit the light to the other end 13 of the bundle. At the end 13, the light diffuses out from each of the fibers through the mask 12 and thus produces a luminous reticle shaped like the opening in the mask. This arrangement enables the luminous reticle to be of limited extent and thus to occupy a limited field. This means that collimation by the device 2 is facillitated in that its object field is small. The above embodiment of a reticle generator is the preferred embodiment for the invention. In particular, it may be mounted on the member 6 by means of a bore through the member 6 which enables the bundle of fibers to move freely therealong prior to being fixed in position. However, this is not the only possible form of reticle generator, and other arrangements may be used, eg. a set of light emitting diodes (LEDs) arranged in a geometrical pattern on the member 6.

FIG. 4 shows one way of providing the optical device 2. It has already been mentioned that the device 2 could be a partially reflective plate shaped like a portion of the surface of a paraboloid. Since it can be difficult to make such a paraboloid shape, a hologram 16 may be used to provide the partial reflection function and the collimating function of the device 2. The hologram 16 comprises a layer of photosensitive material 14 deposited on a supporting layer 15 of transparent material. The thickness e of the layer of photosensitive material 14 is preferably large relative to the wavelength of the light used to form the luminous reticle. It is known that such holograms may combine transmission properties with reflection properties.

In particular, it may reflect light at a given wavelength and transmit a spectral band of light from which the reflecting wavelength is absent. Further, it is known that for such a hologram, the light-collimating function is independent of the geometrical shape of the support on which it is made. In particular, the photsensitive layer 14 and the supporting layer 15 may both be plane.

Theory demonstrates that the collimation function recorded in a hologram depends solely on the way in which the hologram was recorded. In the present invention the hologram 16 is required to reflect rays coming from a point P (referred to, by extension, as the focus) in the form of parallel rays 17. The hologram 16 is recorded by the known technique of using two mutually coherent monochromatic sources which are placed in suitable positions for the recorded hologram to have the required properties. In particular, the hologram 16 is recorded by a first point source of light placed at its focal point P and by a second point source of light 31 which is collimated by a lens 32 located on the side of the hologram 16 opposite from the side to which the parallel rays 17 are to be reflected. Hologram theory shows that the equi-phase surfaces recorded in the photosensitive layer of the hologram are paraboloidal in shape and of the same configuration as that suggested above for the device 2.

If the hologram having the properties of the device 2 in accordance with the invention is planar, the equiphase surfaces that show the holographic effect will intersect the surface of the hologram. A hologram recorded under such circumstances thus presents a degree of chromatic aberration. To avoid or reduce such chromatic aberration, the hologram may be recorded on a spherical surface whose radius of curvature RC (see FIG. 4) is so disposed that the focus of the resulting hologram is at or close to the focus of a spherical mirror of the same dimensions as the support.

FIG. 4 shows a particular light ray 18 being reflected as a ray 18.1 from the front face of the hologram and as a light ray 18.2 from the back surface thereof. This diagram serves to show an additional advantageous feature of using a hologram as the collimating and partially reflecting device 2, instead of a conventional partially reflecting plate. The intensity of the light ray 18.2 as reflected by the holographic mirror is about 90% of the incident ray 18. The ray 18.1 is only about 0.05% of the incident ray 18. This "glass" reflection is thus very small compared to the ray transmitted by the hologram, and in any case the ratio is such that the eye of the observer is insensitive to the ray 18.1. This is in contrast to prior art partially reflective devices made on transparent materials, since there the ratio of the "glass" reflection to the useful reflection is about 5%, which can be confusing for the observer.

FIG. 5 shows a servo-control circuit for keeping the sight 10 in accordance with the invention aimed in the same direction as an associated device 20. FIG. 5 shows the sight comprising the reticle generator 1, the device 2, the drive means 3.1 and the support means 4 enabling the eye 7 of an observer at an angle B relative to a reference direction marked ref.0 on the figure. The associated device 20 points in a direction making an angle C relative to the reference direction. To simplify the explanation, it is assumed that these various directions are all in the same plane. In particular, they are all in the same vertical plane, ie. all the angles represent different angles of elevation. Nevertheless, it is pefectly possible to vary the azimuth of the various directions or to vary both azimuth and elevation, in particular by means of the two sets of motors 3.11–3.12 and 3.2 described above. If there are two degrees of angular freedom, then there need to be two independent servo-control circuits, one operating on the angle of elevation and the other on the angle of azimuth. The associated device 20 may for example, be a canon, a missile launching tube, or a camera.

In the example shown, the drive means comprises an electric motor 3.1 which is driven by an amplifier 24. Depending on the signal delivered by the amplifier 24, the motor 3.1 is driven in one direction or the other, or is stopped. A potentiometer 21 is connected across DC voltages of $-V2$ and $+V2$ and its cursor is driven by means for aiming the associated device 20. The cursor thus delivers an electrical signal representative of the direction in which the device 20 is pointing. Similarly, a potentiometer 22 is connected across DC voltages of $-V1$ and $+V1$ and its cursor is driven by the shaft 8 of the sight drive means. The voltages $-V1$ and $+V1$ may be identical to the voltages $-V2$ and $+V2$. The voltage signals provided by the cursors are applied to the inputs of a comparator 23 which delivers an electrical output signal proportional to the difference between the cursor voltages. This electrical signal is applied to the input of the amplifier 24. It can thus be seen that any change in the elevation of the associated device 20 immediately causes a corresponding change in the elevation of the sight 10. The light source 25 illuminates one end of the bundle of optical fibers 26 whose other end provides the luminous reticle. The observer's eye 7 thus sees a collimated image of the reticle along the direction B which is servo-controlled to the direction C.

The directions B and C are the same as each other when the associated device 20 is a camera; otherwise, when the associated device 20 is a ballistic weapon, there is a small difference between the directions B and C to provide the necessary compensation. In this case, the elevation correction also needs to take into account the angle of the weapon 20 relative to the horizontal and to vary as a function of said angle. In an application where the sight and the weapon are mounted in a vehicle, the servo-control may include means for taking account of the vehicle's speed. Such diverse corrections may be applied via an extra input Co to the comparator 23.

FIG. 6 is a diagrammatic perspective view of a sight in accordance with the invention being used as a gunsight on a helicopter 30. The direction of aim B is shown as a dashed line and corresponds to the direction C, also shown in dashed lines, in which the weapon 20 is pointing. The diagram also shows directions 28 and 29 representing the limits of the field of observation which is much wider than the desired aiming field as it appears to the helicopter pilot. The sight in accordance with the invention does not constitute an interference with the pilot's overall field of view. To this end, it may be observed that the invention may be used in such a manner that drive means 3 for one or two degrees of freedom are fitted on a pre-existing mask to the pilot's field of view, namely an arch 9.1 on which the helicopter windscreen is mounted. Thus the drive means themselves, together with the associated fixing member 6 and the potentiometer 22 need not increase obstruction to the pilot's field of view.

We claim:

1. A head-up sight comprising:
   a luminous reticle generator;
   a single optical component both for producing a collimated image of the reticle and for enabling said image to be viewed simultaneously with an external landscape;
   mechanical means for fixing the single optical component relative to the reticle to constitute a movable assembly; and
   drive means for rotating the assembly to move the reticle image and perform the aiming function.

2. A sight according to claim 1, wherein the drive means are servo-controlled to the position of an associated device whose aiming point is provided by the sight.

3. A sight according to claim 1, wherein the luminous reticle is a luminous object of small field constituted by the luminous end of a bundle of optical fibers fitted with a cut-out mask.

4. A sight according to claim 1, wherein the said single optical component comprises a partially reflective device which is stigmatic for its focus and infinity.

5. A sight according to claim 1, wherein the said single optical component is in the shape of a portion of the surface of a sphere and comprises a hologram having the property of conjugating its focal point and infinity, and wherein the reticle is situated at the focal point of the hologram.

6. A sight according to claim 1, wherein said mechanical means for fixing the single optical component relative to the reticle mask little of the observer's field of view, and wherein the drive means comprise an electric motor giving one degree of angular freedom to the sight.

7. A sight according to claim 6, wherein the drive means include a second electric motor giving a second degree of angular freedom to the sight.

8. A sight according to claim 2, wherein the servo-control is provided by a circuit which delivers an electrical signal to control the drive means as a function of a measured difference in angle between the sight and the associated device.

9. A sight according to claim 8, wherein the servo-control circuit further includes means for performing corrections to the angle of elevation as a function of tactical data.

10. A sight according to claim 1 said sight being mounted as a gunsight in a vehicle including a transparent windshield supported by a non-transparent arch, said drive means being mounted on said arch in such a manner as to mask the user's field of view very little more than does the arch.

* * * * *